Sept. 11, 1934.                J. H. SCHREIBER                1,973,395
                              NUT CRACKING MACHINE
                            Filed May 10, 1930         4 Sheets-Sheet 1
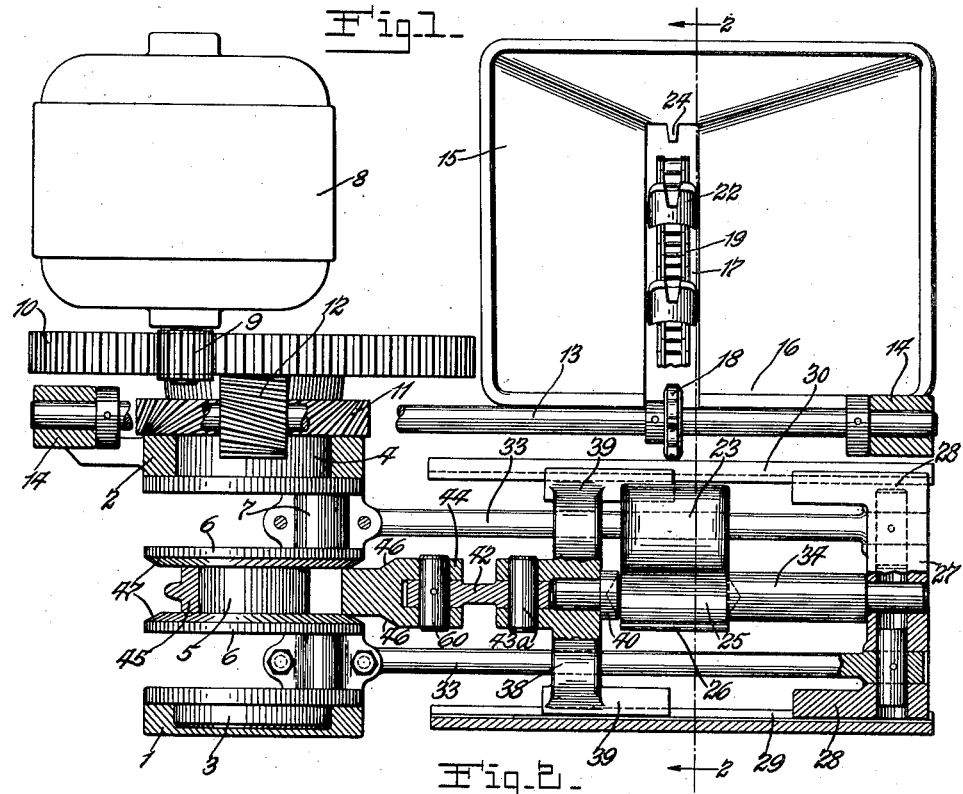
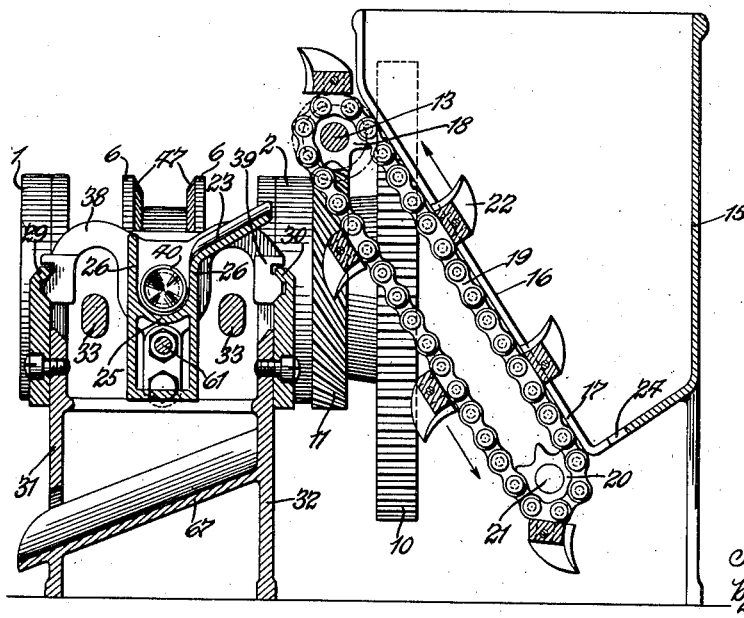
Inventor:
John H. Schreiber,
by Rippey & Kingsland
His Attorneys.

Sept. 11, 1934.     J. H. SCHREIBER     1,973,395
NUT CRACKING MACHINE
Filed May 10, 1930     4 Sheets-Sheet 2
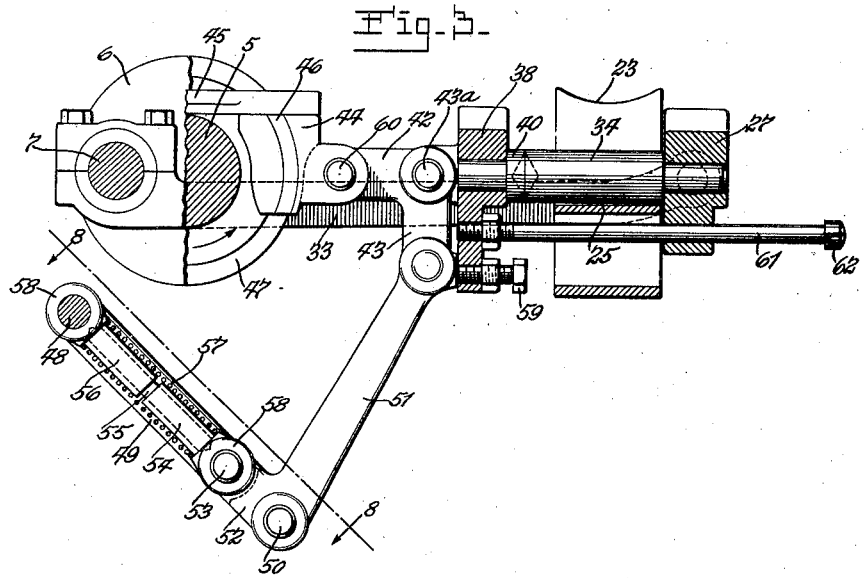
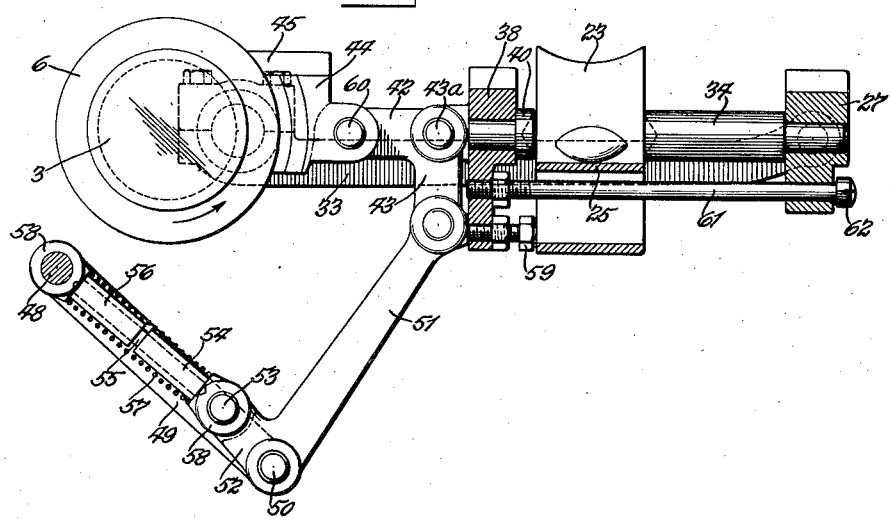
Inventor.
John H. Schreiber,
by Rippey & Kingsland
His Attorneys.

Sept. 11, 1934.  J. H. SCHREIBER  1,973,395
NUT CRACKING MACHINE
Filed May 10, 1930  4 Sheets-Sheet 3

Inventor:
John H. Schreiber,
by Hippey & Kingsland.
His Attorneys.

Sept. 11, 1934.   J. H. SCHREIBER   1,973,395
NUT CRACKING MACHINE
Filed May 10, 1930   4 Sheets-Sheet 4

Inventor:
John H. Schreiber,
by Rippey & Kingsland,
His Attorneys.

Patented Sept. 11, 1934

1,973,395

UNITED STATES PATENT OFFICE 1,973,395

NUT CRACKING MACHINE

John H. Schreiber, St. Louis, Mo.

Application May 10, 1930, Serial No. 451,269

14 Claims. (Cl. 146—12)

This invention relates to nut cracking machines, and has special reference to the construction, arrangement and mode of operation of the hammer and anvil members by operation of which the nuts are cracked.

An object of the invention is to provide an improved nut cracking machine comprising hammer and anvil members between which the nuts are delivered and by operation of which the nuts are cracked, in combination with means functioning automatically and as an incident to the operation of the machine to regulate the cooperative action of said members, so as to crack nuts of widely varying sizes without the necessity of adjusting the machine to crack nuts of the different sizes and without delivering nuts of assorted sizes to the machine. To obtain this object and to enable the machine to operate satisfactorily in the cracking of the nuts of mixed sizes and without regard to the sizes of the nuts, provision is made for the release of the anvil member from rigidity at the proper time irrespective of whether the nuts are large or small and without damage to the nut kernels.

Another object of the invention is to provide an improved nut cracking machine constructed and arranged to operate so that the nuts are cracked between the anvil and hammer members without exerting substantial strains upon the machine frame, so that the machine may be made relatively light as to weight. In the accomplishment of this purpose, I provide a crank shaft for controlling the hammer and anvil members and to receive the strains resulting from the operation of said members in the cracking operations without transmitting such strains to the machine frames.

Other objects will appear from the following description, reference being made to the accompanying drawings, in which—

Fig. 1 is a combined plan and sectional view showing important features of the invention.

Fig. 2 is a vertical cross-sectional view approximately on the line 2—2 of Fig. 1.

Fig. 3 is a detail view showing an idling operation of the machine.

Fig. 4 is a view showing the hammer and anvil members spaced apart ready for operation upon an interposed nut.

Figure 5:
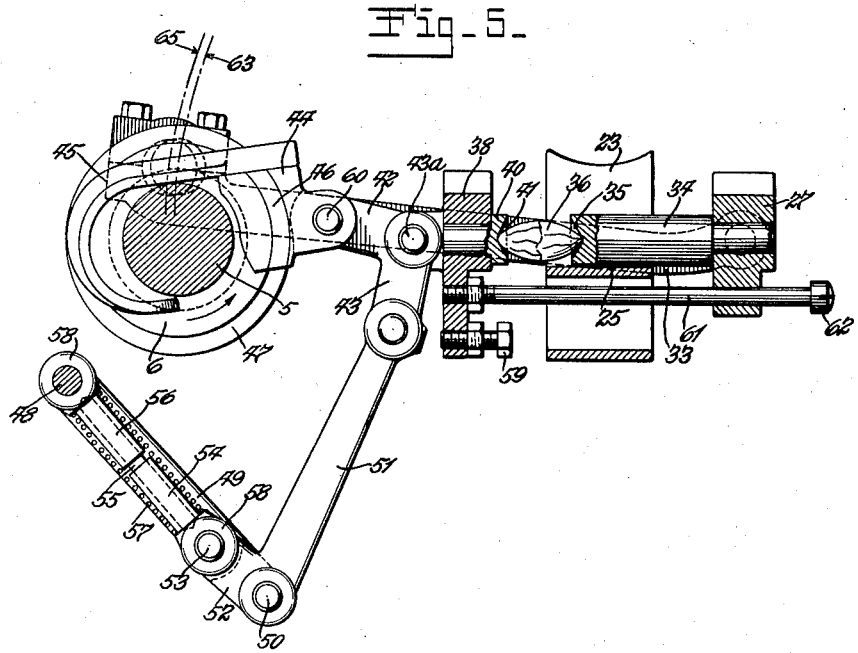
Fig. 5 is a view similar to Fig. 4 showing the positions of the parts during operation of the hammer and anvil members to crack an interposed nut of relatively large size.

The machine comprises a frame 1 and spaced therefrom at a suitable distance another frame 2. A shaft has one end 3 journalled in the frame 1 and a part 4 journalled in the frame 2. These parts 3 and 4 are in axial alinement and are connected by the crank devices. The crank devices include an intermediate shaft portion 5 in axial alinement with the shaft portions 3 and 4 and having a disc 6 attached to each of its ends. The discs 6 are connected with the respective shaft portions 3 and 4 by cranks 7 arranged eccentrically of the axis of the shaft.

A motor 8 drives a pinion 9 which is in mesh with a gear wheel 10 attached to one end of the shaft portion 4. A spiral gear 11 is attached to the shaft portion 4 and meshes with a spiral pinion 12 attached to a shaft 13 journalled for rotation in bearings 14.

A nut receptacle or hopper 15 contains the nuts to be cracked, and has an inclined wall 16 in which is a slot 17 extending upwardly from the bottom of said hopper or receptacle. A conveyor is provided and is operated by the shaft 13 to remove the nuts individually from the hopper 15 and discharge the nuts for delivery to position between the hammer and anvil nut cracking devices to be cracked thereby. The shaft 13 has thereon a sprocket wheel 18 over which passes an endless sprocket chain 19 which also engages a sprocket wheel 20 on a supporting shaft 21 near the lower end of the hopper 15. Thus, the sprocket chain 19 is operated upwardly at or adjacent to the slot 17 so as to form a moving wall substantially closing said slot to prevent the nuts from dropping out of the hopper through the slot 17. A series of bifurcated conveyor arms 22 are attached to the chain 19. These arms project through the slot 17 during their upward movement and convey the nuts individually from the hopper 15 and discharge the nuts onto an inclined chute 23 inclining toward the cracking devices. An arm 24 projects into the lower end of the slot 17 and prevents the nuts from dropping out. The spaced portions of the bifurcated conveyor arms 22 pass at opposite sides of the arm 24 without interference thereby, as will readily be understood by reference to Fig. 1 of the drawings. This conveyor device is operated constantly when the motor is running.

From the chute 23 the nuts drop into a holder comprising a bottom wall 25 and side walls 26. The machine is so arranged and operated that only one nut is in the holder at any one time, each nut being cracked and discharged before another nut is delivered to the cracking devices by the conveyor.

A carriage comprising a transverse portion 27 and side portions 28 is mounted to slide along a track or guide comprising a pair of spaced side rails 29 and 30. These side rails 29 and 30 are attached to the side frames 31 and 32 of the machine.

A pair of rods 33 have their ends pivoted to the carriage 27 and to the cranks 7, respectively. It is now apparent that when the motor is running, the cranks 7 are rotated, the rods 33 are thereby operated and the carriage 27 is reciprocated longitudinally along the track or guides 29 and 30. A hammer nut cracking member 34 has one end attached to the carriage 27 and projects from said carriage toward the nut-holder 25. When the carriage 27 is moved toward the nut-holder 25, the nut cracking hammer 34 is moved above and along the support 25, in which the nut is supported longitudinally because of the rounded shape of said support 25 and the elongated shape of the nut. The free end of the nut cracking hammer 34 has therein a recess 35 in which the ends of a nut 36 (Fig. 5) or a nut 37 (Fig. 6) are received.

An anvil carriage comprising a transverse portion 38 and side portions 39 is mounted to slide along the track or guides 29 and 30. A nut cracking anvil 40 is supported by the carriage 39 in axial alinement with the nut cracking hammer 34 and has, in its end that is toward the hammer, a recess 41 designed and adapted to receive the end of the nut 36 (Fig. 5) or the end of the nut 37 (Fig. 6), or the ends of other nuts of different shapes and sizes.

A bell crank lever comprising an arm 42 and an arm 43 has its angle mounted on a pivot 43$^a$ supported by the carriage 38. The arm 42 of said bell crank lever is pivoted to an operating member 44 designed and arranged to cooperate with the discs 6 to impart initial movement to the bell crank lever 42—43 preparatory to operation of the anvil to release and discharge the cracked nut at each cracking operation. A support for the operating member 44 engages the shaft portion 5, and, in the embodiment shown, comprises a curved arm 45. The operating member 44 is provided with friction surfaces 46 arranged to be pressed into contact with matching surfaces 47 on the discs 6 automatically and as an incident to the operation of the machine during the cracking of a nut, so as to cause the rotating discs 6 to move the member 44 from the position shown in Fig. 3.

Figure 8:
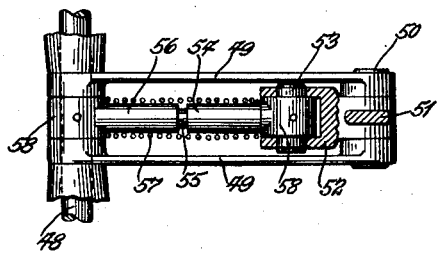
Fig. 8 is a detail view showing a part of the anvil operating mechanism.

A shaft 48 supports a pair of spaced arms 49 (Fig. 8) the lower ends of which support a pivot 50. A bell crank lever is mounted on the pivot 50 and has an arm 51 pivoted to the bell crank arm 43, and has another arm 52 supporting a pivot 53. A tubular arm 54 is attached to the pivot 53 and encloses one end of a rod 55 the opposite end of which is enclosed in a tubular arm 56 supported by the shaft 48. A spring 57 encircles the arms 54 and 56 and has its ends bearing against the hubs 58 of said arms 54 and 56.

An abutment 59 is mounted for adjustment in the carriage 38. This abutment 59 is adjustable to serve as an abutment for the end of the arm 43 (Figs. 3 and 4). In proper adjustment of the abutment 59, the pivot 60 connecting the bell crank arm 42 with the actuating member 44 is in approximate alinement with the axis of the nut cracking hammer 34 and of the nut cracking anvil 40 and of the pivot 43$^a$. In such position, the pivot 53 is slightly above the plane between the axes of the shaft 48 and the pivot 50, so that the power and energy of the spring 57 is exerted and is utilized to hold the parts in this position.

A rod 61 has one end screwed into the carriage 38 and the opposite end mounted for sliding movements in the carriage 27, so as to permit free movement of the carriage 27 along the rod 61. The rod 61 is provided with a head 62 that will be engaged by the carriage 27 during the outward movement of said carriage so as to operate the carriage 38 and thereby restore said carriage 38 to the position shown in Fig. 4.

Figure 6:
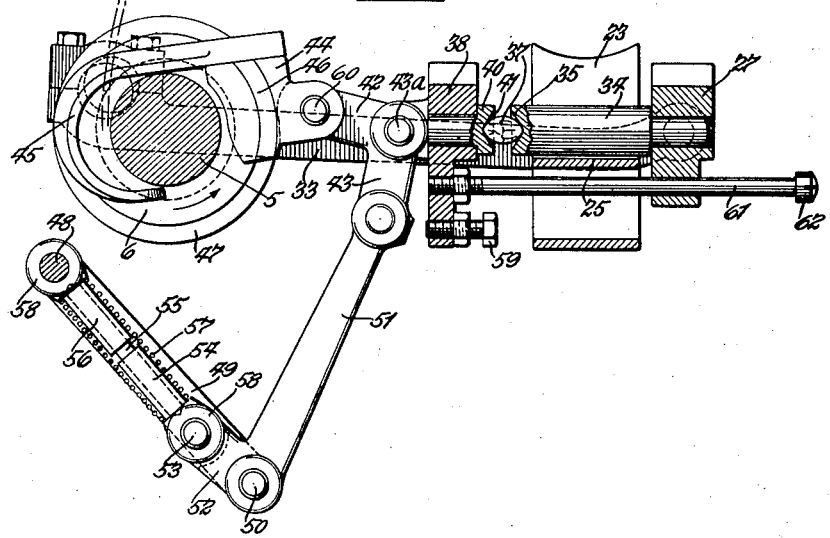
Fig. 6 is a view similar to Fig. 5 showing the positions of the parts during operation of the hammer and anvil members to crack an interposed nut of relatively small size.
Figure 7:
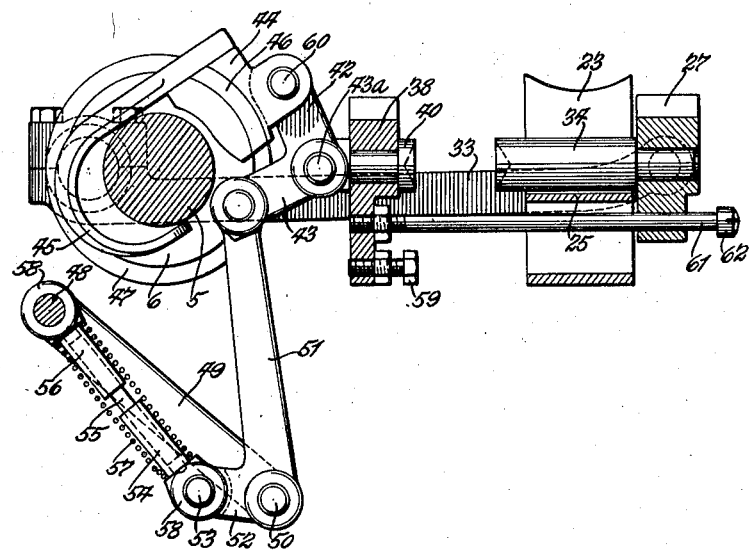
Fig. 7 is a view similar to Fig. 6 showing the positions of the parts after the cracked nut has been discharged.

The machine is operated by energizing the motor 8 and thereby rotating the gear wheel 10. The gear wheel 10 rotates the crank shaft and also rotates the conveyor shaft 13. The conveyor shaft 13 operates the conveyor and delivers the nuts individually into the nut-holder 25. The nut cracking hammer is operated once during each revolution of the crank shaft, causing the hammer 34 to move over the nut-holder 25 and engage the adjacent end of a nut, whether the nut be a large nut such as the nut 36 (Fig. 5) or a small nut such as the nut 37 (Fig. 6). The continued movement of the hammer is sufficient to press the opposite end of the nut against the anvil 40. If the nut is a large nut such as the nut 36 (Fig. 5), the nut will be engaged with the anvil 40 during the final portion of the upward movement of the cranks 7. But, if the nut is a small nut such as the nut 37 (Fig. 6), the nut will not be engaged with the anvil 40 until after the cranks 7 have reached their uppermost positions and have started downwardly. The approximate position of the axis of the cranks 7 when engaged by a long nut 36 is indicated by the line 63 (Fig. 5), and the approximate position of the cranks when engaged by a small nut 37 is indicated by the line 64 (Fig. 6). The axis of the cranks moves approximately from the line 63 to the line 65 (Fig. 5) while the actuator 44 is engaged with the discs 6 during which time the cracking of the large nut 36 is effected. And the axis of the cranks 7 moves approximately from the line 64 to the line 66 (Fig. 6) while the actuator 44 is engaged with the discs 6 during which time the cracking of the small nut 37 is effected.

During these movements of the cranks, the nuts are cracked. The cracking of the nuts is completed during the time that the actuator 44 is effectively engaged with the discs 6 for operation thereby. During the time that the actuator 44 is effectively engaged with the discs 6 for operation by said discs, said actuator is moved to about the position shown in Figs. 5 and 6. In the latter position, the axis of the pivot 53 is below the plane between the axis of the pivots 48 and 50. In such position, the pivot 53 is below dead center and the spring 57 immediately operates to complete the final movements necessary to discharge the cracked nut. That is to say, the spring 57 acts to move the carriage 38 in a direction and to an extent to carry the anvil 40 out of engagement with the cracked nut, thus permitting the nut to drop from between the hammer and the anvil onto a discharge chute 67. This movement of the carriage 38 by the spring 57 is faster than the movement of the carriage 27, so that the release and discharge of the cracked nut is quickly effected.

The lines 63 and 65 (Fig. 5), in comparison with the lines 64 and 66 (Fig. 6), illustrate generally and diagrammatically the extent of longitudinal movement of the cracking hammer 34 while in abutting engagement with and cracking relatively large nuts and relatively small nuts, respectively. This is because a greater movement of the hammer 34 is needed properly to crack a large nut 36 than is needed to crack a small nut 37. If the hammer 34 moved the same distance during the effective cracking operations of large and small nuts, it would result either in crushing the kernels of the small nuts or in failing properly to crack the large nuts. In order to accommodate the machine to these requirements and to insure the proper cracking of all nuts of different sizes, I have provided the novel anvil control mechanism which operates under control of the nuts and during the time that the nuts are being cracked by the cooperation of the hammer and the anvil, so that the anvil will be released as soon as the nuts are properly cracked, irrespective of the sizes of the nuts and before the nuts are crushed.

The effective movement of the cracking hammer 34 while in abutting engagement with and cracking nuts I define as the cracking stroke. Consequently there is a longer cracking stroke of the hammer 34 while said hammer is in abutting engagement with and cracking relatively large nuts than in the case of smaller nuts. And there is a shorter cracking stroke of the hammer 34 while said hammer is in abutting engagement with and cracking smaller nuts than in the case of larger nuts.

It is now clear that this machine automatically accommodates nuts of various sizes, and that it is wholly unnecessary to grade the nuts as to size and to adjust the machine for nuts of different sizes. This is because the machine automatically accommodates the nuts of different sizes, due to the novel construction and mode of operation of the nut cracking members. An important feature of the invention in this respect is the mechanism for imparting the initial and final movements to the nut cracking anvil for the release and discharge of the cracked nuts at the proper time, irrespective of variations in the sizes of the nuts. The machine may be widely varied in these respects without departure from the nature and principle of the invention. I do not restrict myself to the specific mechanism shown and described, but contemplate such variations as may be found desirable to adapt the machine to its intended uses.

I claim:—

1. A nut cracking machine comprising an anvil, resilient means for holding said anvil in a nut cracking position, a hammer, mechanism for operating said hammer to crack nuts interposed between said hammer and said anvil and for moving said anvil from nut cracking position in opposition to said resilient means, and mechanism for imparting a final movement to said anvil after the initial movement of said anvil as aforesaid to permit said anvil to discharge the cracked nuts.

2. A nut cracking machine comprising an anvil, resilient means for holding said anvil in a nut cracking position, a hammer, mechanism for operating said hammer to crack nuts interposed between said hammer and said anvil and for moving said anvil from nut cracking position in opposition to said resilient means, mechanism for imparting a final movement to said anvil after the initial movement of said anvil as aforesaid to permit said anvil to discharge the cracked nuts, and means for restoring said anvil to nut cracking position in opposition to the power of said resilient means.

3. A nut cracking machine comprising an anvil, resilient means for holding said anvil in a nut cracking position and permitting movement of said anvil from nut cracking to nut releasing position, a hammer, and mechanism for operating said hammer to crack nuts interposed between said hammer and said anvil and to cause the nuts to move said anvil to nut releasing position in opposition to said resilient means at times dependent only upon the sizes of the cracked nuts.

4. A nut cracking machine comprising an anvil, resilient means for holding said anvil in a nut cracking position and permitting movement of said anvil from nut cracking to nut releasing position, a hammer, mechanism for operating said hammer to crack nuts interposed between said hammer and said anvil and to cause the nuts to move said anvil to nut releasing position in opposition to said resilient means at times dependent only upon the sizes of the cracked nuts, and means for restoring said anvil to nut cracking position.

5. A nut cracking machine comprising hammer and anvil nut cracking devices for cracking nuts interposed between them, mechanism for imparting to said hammer a cracking stroke effective to crack nuts of various sizes interposed between said hammer and said anvil, and means cooperating with said mechanism and controlled by the nuts being cracked to cause said hammer to move through a longer cracking stroke in cracking long nuts than in cracking shorter nuts.

6. In a nut cracking machine, a rigid movable cracking member, a releasable cracking member, means for holding said releasable cracking member in position for a cracking operation of said movable cracking member, means for moving said releasable cracking member to released position, and mechanism for moving said movable cracking member and said means at varying speeds according to the lengths of the nuts being cracked to vary the effective cracking stroke imparted against nuts of various lengths.

7. In a nut cracking machine, a rigid movable cracking member, a releasable cracking member, means for holding said releasable cracking member in position for use, means for moving said releasable cracking member to releasing position, and mechanism for moving said movable cracking member and said means at varying relative speeds according to the lengths of the nuts being cracked to vary the effective cracking stroke of said movable cracking member in relation to said means in various relative positions of the latter.

8. In a nut cracking machine, cracking mechanism having a variable effective cracking stroke, and means controlled by the nuts controlling the length of said cracking stroke to provide a longer cracking stroke for long nuts than the cracking stroke for shorter nuts.

9. In a nut cracking machine, a supporting frame, an operating crank-shaft rotatively supported by said frame, a reciprocating member, connections for operating said reciprocating member by said crank-shaft to crack nuts during a movement of said reciprocating member toward said crank-shaft and devices connected with said crank-shaft and cooperative with said reciprocating member to transmit the entire forces of such operation to said crank-shaft without imparting these forces to the supporting frame other than through said crank-shaft.

10. In a nut cracking machine, reciprocating nut cracking devices, mechanism for operating said nut cracking devices to engage and move through an effective cracking stroke while in engagement with nuts interposed between said cracking devices, and means in connection with certain of said cracking devices and operated under control of the nuts between said cracking devices to cause a longer effective stroke of said cracking devices in cracking larger nuts than in cracking smaller nuts.

11. A nut cracking machine comprising hammer and anvil nut cracking devices for cracking nuts interposed between them, a rotating crank element, connections from said crank element for imparting to said hammer a cracking stroke effective to crack nuts of various sizes interposed between said hammer and said anvil, and means moved into operative engagement with said crank element by said anvil device during effective cracking stroke of said hammer and conditioned by said crank element preparatory for release of said anvil from the cracked nut.

12. A nut cracking machine comprising a hammer cracking member, an anvil cracking member, a rotating crank element, connections from said crank element for operating said hammer cracking member in cracking strokes effective to crack nuts of various sizes interposed between said hammer and anvil cracking members, means for holding said anvil cracking member in position to cooperate with said hammer cracking member and for imparting final movements to said anvil cracking member to discharge cracked nuts, and means moved into operative engagement with said crank element by said anvil cracking member during effective cracking stroke of said hammer and conditioned by said crank element for operation by said holding means to release cracked nuts.

13. In a nut cracking machine, hammer and anvil cracking members, a rotary crank element for operating said hammer cracking member in effective cracking strokes to crack nuts of various sizes interposed between said members, means for moving said anvil cracking member to releasing position, and mechanism moved by said anvil cracking member into cooperating engagement with said crank element for operation by said crank element to position in which said means will move said anvil cracking member to releasing position in different positions of said hammer cracking member according to the lengths of the nuts being cracked.

14. In a nut cracking machine, hammer and anvil cracking members, mechanism for moving said hammer cracking member in effective cracking strokes, mechanism for holding said anvil cracking member in position to cooperate with said hammer cracking member to crack nuts of various sizes interposed between said cracking members and for moving said anvil cracking member to releasing position after each nut has been cracked, and means operated by said anvil cracking member into engagement with said first named mechanism for operation thereby to position for further operation to releasing position by said second named mechanism.

JOHN H. SCHREIBER.